Nov. 29, 1960      J. SELZER      2,961,856
COG WHEEL CONSTRUCTION
Filed Jan. 30, 1957
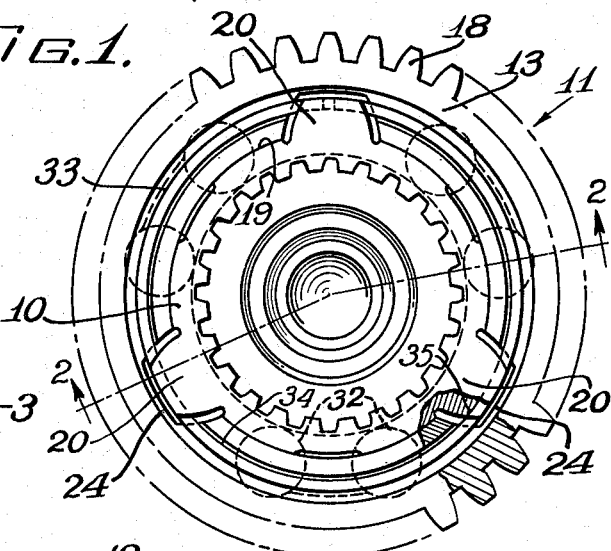
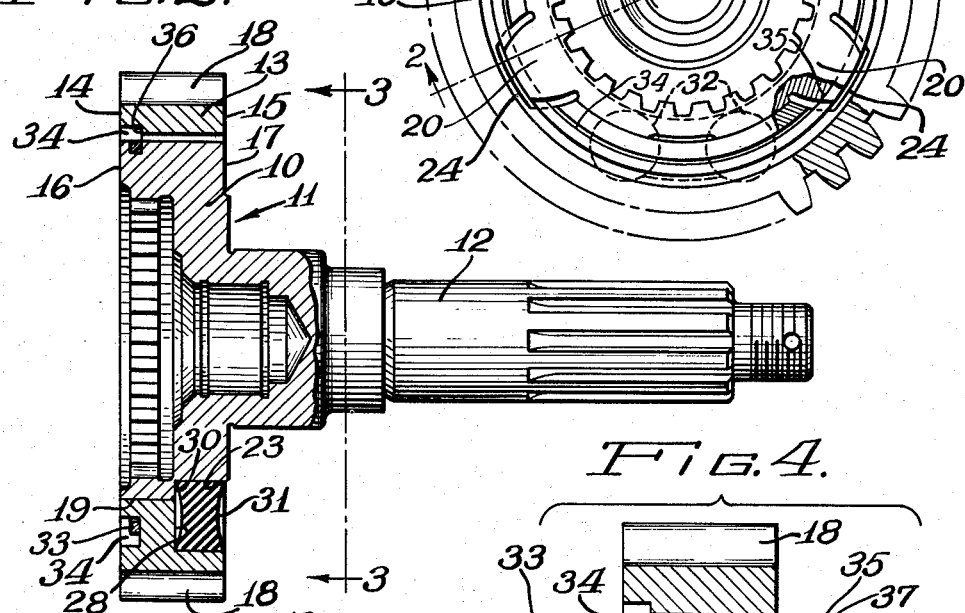
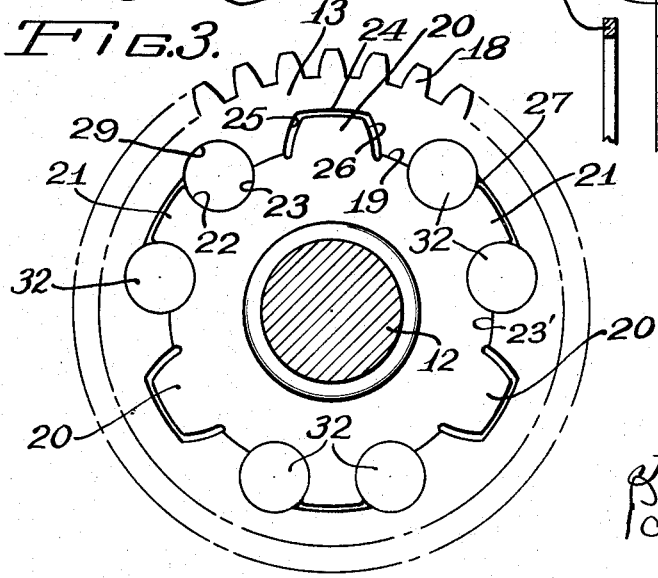
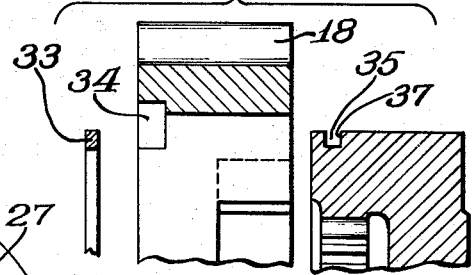
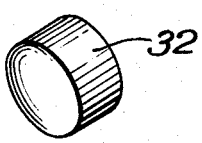
Inventor:
John Selzer United States Patent Office 2,961,856
Patented Nov. 29, 1960

2,961,856
COG WHEEL CONSTRUCTION

John Selzer, Fort Wayne, Ind., assignor to International Harvester Company, Chicago, Ill., a corporation of New Jersey Filed Jan. 30, 1957, Ser. No. 637,135

11 Claims. (Cl. 64—27)

This invention relates to cog wheel or gear constructions and more particularly to a gear construction having cushioning means interposed between the tooth portion thereof and the hub.

In certain forms of power transmission mechanisms particularly those of the motor truck type employing gears to interconnect the drive and driven shafts the transmission and consequently the gearing must be capable of operating efficiently over a wide range of variable torque and speed conditions which changes in conditions oftentimes occur rapidly. Heretofore when the transmission was subjected to suddenly applied load or speed changes distortion of the shafts as well as overstressing of the gear teeth of the gear elements occurred with the inevitable result that frequent breakage of the shafts and/or the gears was experienced. Also because of the relatively large masses of material in the form of the gears have to be set in motion and rotated at relatively high speeds the gears can vibrate which results in hammering and chattering of the mating teeth and the generation of abnormally high stresses. The vibrations are due to torsional oscillations and if permitted to go unchecked oftentimes causes fracture of the gear teeth. It is therefore the primary objective of the present invention to provide a gear element for use in a motor vehicle power transmission wherein the gear toothed rim of the gear element is connected to the hub portion thereof in such a manner that it may be displaced in a circumferential direction a limited amount with respect to the hub against cushion means where the damaging influence of the shocks, strains and torsional vibrations experienced by the transmission in the operation thereof is mitigated.

A further object is to provide a quietly running gear element of simple and economical construction which may be readily assembled, disassembled and repaired.

A still further object of the invention is to provide a gear element including a tooth rim member and a hub member having cushioning means interposed therebetween which gear element is adapted to absorb sudden torque strains in the power transmission system utilizing the gear element and to provide a yielding but positive driving connection between the rim and hub members of the gear element.

Another object is to provide a quiet running gear wheel and to reduce gear chatter and noise in the transmission where such gear wheels are employed. It is also an object of the invention to eliminate torsional vibration in the gear train when gears are idling and under no torque driving loads except that which propels the gears.

The foregoing and other important objects and desirable features inherent in and encompassed by the invention together with many of the purposes and uses thereof will become readily apparent from a reading of the ensuing descripiton in conjunction with the annexed drawings in which:

Figure 1 is an end elevational view of a gear unit embodying the invention;

Figure 2 is a sectional view taken substantially along line 2—2 of Figure 1;

Figure 3 is a sectional view taken substantially along line 3—3 of Figure 2;

Figure 4 is a fragmentary view of certain of the parts showing the same in spaced relation, and Figure 5 is a perspective view of a cushioning member.

Referring to the drawing in detail wherein like reference characters represent like elements throughout the various views numeral 10 is employed to designate the hub member of a gear unit 11. The hub member 10 is shown integrally formed with one end of a shaft 12 such as that employed in a motor vehicle power transmission. The gear unit 11 includes an externally toothed rim member 13, the transverse ends of which are defined by radially extending substantially flat surfaces 14 and 15 which are substantially in radial alignment with radial surfaces 16 and 17, respectively, of the hub member 10 when the rim member 13 is assembled on the hub member 10, as shown in Figure 2. The rim member 13 is provided with teeth 18 on its outer periphery for meshing engagement with a gear (not shown) of the power transmission.

Referring to the construction of the hub member 10 in detail, it will be noted that the hub member 10 is provided with a generally cylindrical bearing surface 19 which extends axially between the radial surfaces 16 and 17 defining the axial ends of the hub member 10. Projecting radially from the bearing surface 19 are a plurality of clutch teeth 20, equally spaced circumferentially about the bearing surface 19. The clutch teeth 20 serve to positively couple the hub member 10 and the rim member 13 together in a manner as will be pointed out hereinafter. Circumferentially spaced midway between adjacent clutch teeth 20 is a radially projecting lug 21. Unlike the clutch teeth 20 which extend axially from radially extending surface 16 to radially extending surface 17 the lugs 21 extend axially from surface 17 to a plane perpendicular to the axis of rotation of the shaft 12, which plane is spaced intermediate the surfaces 16 and 17. The circumferentially spaced sides 22 of each lug 21 are semi-cylindrical in form and are continuations of semi-cylindrical surfaces 23 defining recesses formed in the hub member 10 at the base of each lug 21.

The inner peripheral surface 23' of the rim member 13 is adapted to engage the bearing surface 19 when the rim member 13 is assembled on the hub member 10. A sliding fit is provided between the engaging surfaces such that the rim member 13 may rotate with respect to the hub member 10 about the axis of rotation of the shaft 12, but is incapable of moving radially with respect to the hub member 10. Extending axially through the rim member 13 between radially extending surfaces 14 and 15 are a plurality of grooves 24. Each groove 24 is adapted to receive a clutch tooth 20. The vertical cross-sectional area of each groove 24 is greater than the cross-sectional area of the tooth 20 received therein. The radially extending surfaces 25 defining each groove 24 are normally spaced and parallel to the respective lateral side walls 26 of a respective clutch tooth 20 as best shown in Figure 3. Circumferentially spaced midway between each pair of adjacent grooves 20 is an axially extending recess 27. The recesses 27 open in the wall 15 and the bottom of the recesses 27 are defined by radially extending wall portions 28 which wall portions 28 lie in the same plane defining the axial ends of the lugs 21. The circumferentially spaced ends of each recess 27 are defined by semi-cylindrical surfaces 29 and when the rim member 13 is assembled on the hub member 10 each semi-cylindrical surface 29 is adapted to be in effect a continuation of a pair of related surfaces 22 and 23. It will be appreciated that the semi-cylindrical surface 22 of each lug 21 and the surfaces 23 and 29 in circular alignment therewith as well as wall portions 28 defining the bottom of the recess 27 and the wall portions 30 defining the bottoms of the recesses formed at the base of each lug 21 define cylindrical pockets 31. The pockets 31 define seats for cylindrical blocks or plugs 32 of yielding non-metallic material. The plugs 32 are retained within the pockets 31 under slight compression.

When assembling the gear unit 11 the rim member 13 is advanced axially. In assembly each clutch tooth 20 is aligned with a respective groove 20 and the rim member 13 is advanced axially with respect to the hub member 10 until the end wall 14 of the rim member 13 is in radial alignment with the end wall 16 of the hub member 10. When the rim member 13 is in this assembled relationship with the hub member 10 each lug 21 will be disposed within a respective recess 27 and lies substantially midway between the circumferentially spaced ends of the recess. Thereafter a rubber plug 32 is inserted axially into each pocket 31, the rim member 13 is prevented from being displaced axially to the right as viewed in Figure 2 when assembled on the hub member 10 by the lugs 21 which bear against the radially extending wall portions 28. In order to prevent axial displacement of the rim member 13 to the left as viewed in Figure 2 a snap ring 33 is employed. The rim member 13 is provided with a plurality of segmental grooves which grooves 34 are in circular alignment. The grooves are formed in the side wall or surface 14 and are radially spaced between the bottom of the clutch tooth grooves 24 and the inner peripheral surface 23'. Each groove 34 extends between and opens into adjacent grooves 24. Each of the clutch teeth 20 is provided with an outwardly facing groove 35. The axial length of the groove 35 is substantially equal to the axial thickness of the snap ring 33 which is approximately one-half the axial depth of the groove 34 such that when the rim member 13 is assembled on the hub member 10 with the lugs 21 abutting the wall portions 28 and the radially extending walls 14 and 16 in radial alignment the bottoms 36 of the grooves 34 are in radial alignment lie in the same radial plane as one side wall 37 of each groove 35. This relationship is best illustrated in Figure 2. Thus to prevent axial displacement of the rim member 13 to the left as viewed in Figure 2 with respect to the hub member 10 the snap ring 33 is expanded and is advanced axially and caused to enter the grooves 34 until it engages the bottoms 36 of the grooves 34. Thereafter the snap ring 33 is released and because of its inherent resilient tendency to contract to a normal smaller size diameter in its unstressed state it enters the grooves 35. It will be appreciated that inasmuch as the snap ring 33 bears against the side walls 37 of grooves 35 and cannot be displaced axially therefrom when released then also bears against the bottoms 36 of the grooves 34 in this contracted condition. It will be appreciated therefore that the rim member 13 is thus fastened to the hub member 10. With the parts constructed and arranged as described hereinbefore, it is believed that the operation of the gear unit 11 will be readily understood. Assuming that the shaft 12 is the driving member, torque is transmitted from the hub member 10 to the toothed rim member 13 through the rubber plugs 32 and the clutch teeth 20. It will be appreciated from the foregoing that when shock loads are applied to the shaft 12 a slight circumferential displacement of the hub member 10 with respect to the toothed rim member 13 occurs. Such circumferential displacement is permitted by virtue of the fact that the surfaces 26 of the positive clutch teeth 20 are normally spaced from the axially extending side walls 25 of the grooves 24. However, the circumferential displacement is yieldingly resisted by the rubber plugs 32 so that the energy imposed by the shock load is absorbed by deformation of the rubber plugs 32. Torsional disturbances or vibrations transmitted from the shaft 12 to the toothed rim member 13 are similarly absorbed. The dampening of vibrations avoids leakage of various shafts of the transmission and excessive tooth wear in the gearing for driving such shafts. The gear unit construction of the present invention permits the gear teeth 18 to be accurately concentric with the hub member 10 during all phases of operation of the gear unit even though the torque transmitted through the gear unit is cushioned. The maintenance of concentricity of the gear teeth 18 with respect to the axis of rotation of the shaft 12 is of the utmost importance in motor vehicle transmissions and such concentricity is maintained in the present gear unit construction.

The embodiment of the invention chosen for the purposes of illustration and description herein is that preferred for achieving the objects of the invention and for developing the utility thereof in the most desirable manner, due regard being had to existing factors of economy, simplicity of design and construction and the improvements sought to be effected. It will be appreciated, therefore, that the particular structural and functional aspects emphasized herein are not intended to exclude but rather to suggest such other adaptations and modifications of the invention as fall within the spirit and scope of the invention as defined in the appended claims.

What is claimed is:

1. A gear wheel construction comprising a hub member having an axially extending, cylindrical bearing surface on its outer periphery; an externally toothed rim member encircling said hub member and having a cylindrical bearing surface on its inner periphery slidingly engaging said bearing surface of said hub member whereby said members are circumferentially displaceable with respect to each other; means for positively limiting the extent of circumferential displacement between said members including a plurality of circumferentially spaced clutch teeth extending radially from the bearing surface of said hub member, each of said clutch teeth being disposed in a respective groove formed in said rim member, the surfaces defining the radially extending side walls of each groove being circumferentially spaced from the adjacent lateral faces of the clutch tooth disposed therein; resilient means operatively interconnecting said members for yieldably resisting circumferential displacement of said members including a segmental recess formed in one radial end wall of said rim member between each pair of adjacent grooves, said recesses having an axial depth less than the axial length of said grooves and having its circumferentially spaced ends defined by semi-cylindrical surfaces, a plurality of lugs extending radially from said hub member bearing surface, each of said lugs being disposed in a respective recess and having an axial end thereof abutting the radial wall portion defining the bottom of the recess to limit axial displacement of said rim member in one direction with respect to said hub member, the lateral faces of each lug being semi-cylindrical and each face being in circular alignment with a semi-cylindrical surface defining the circumferential spaced end of a recess, each pair of said circularly aligned faces and semi-cylindrical surfaces partially defining a pocket, and a cylindrical rubber plug disposed and frictionally held in each pocket; and quick detachable securing means for maintaining said axial ends of said lugs abutting said radial wall portions defining the bottoms of said recesses.

2. A gear wheel construction substantially as set forth in claim 1, in which, said quick detachable securing means includes a groove formed in each of said clutch teeth, an arcuate recess extending between adjacent grooves in said rim member, said arcuate recesses and clutch teeth grooves being in circular alignment when said lugs abut said radial wall portions defining the bottoms of said recesses, and a resiliently contractible snap ring disposed within said clutch teeth grooves and the last mentioned recesses of said rim member.

3. A gear wheel construction comprising a hub member; an externally toothed rim member encircling said hub member, said members having mating bearing surfaces whereby said members are circumferentially displaceable relative to each other and are radially fixed with respect to each other; means for positively limiting the extent of circumferential displacement between said members; and resilient means operatively interconnecting said members for yieldably resisting circumferential displacement of said members including a plurality of circumferentially spaced and aligned segmental recesses formed in the said rim member, a plurality of radially extending lugs formed on said hub member, each of said lugs being disposed in a respective recess and having a surface thereof abutting a surface of said rim member defining said respective recess, said lugs having a circumferential length less than the circumferential length of the recess in which it is disposed whereby each of the lateral faces of each lug is circumferentially spaced from a surface defining one circumferentially spaced end of a recess, said resilient means further including a non-metallic deformable plug disposed and frictionally held between each lateral face of each lug and the adjacent spaced surface defining one circumferentially spaced end of each of said recesses.

4. A gear wheel construction substantially as set forth in claim 3, including quick detachable securing means for maintaining said lugs in abutting engagement with the surfaces of said rim member defining said recesses.

5. A gear wheel construction as set forth in claim 4, in which, said quick detachable securing means includes a plurality of circumferentially spaced arcuate grooves formed in said hub member, and a plurality of circumferentially spaced arcuate grooves formed in said rim member adapted to be in circular alignment with said grooves of said hub member when the surfaces of said lugs abut said surfaces of said rim members defining said recesses, and a resiliently contractible snap ring disposed within said circularly aligned grooves of said hub and rim members.

6. A gear wheel construction as set forth in claim 5, in which, said circularly aligned arcuate grooves of said rim and hub members are radially spaced outwardly of said engaging bearing surfaces of said rim and hub members.

7. A gear wheel construction as set forth in claim 6, in which, said resilient means includes plugs of non-metallic elastically yieldable material.

8. A gear wheel construction comprising a hub member having a cylindrical bearing surface on its outer periphery; an externally toothed rim member encircling said hub member and having a cylindrical bearing surface on its inner periphery slidingly engaging said bearing surface of said hub member whereby said hub and rim members are circumferentially displaceable with respect to each other; means for positively limiting the extent of said circumferential displacement between said members; resilient means operatively interconnecting said members and extending radially on each side of said bearing surfaces for yieldably resisting said circumferential displacement of said members; and quick detachable means for preventing axial displacement of said hub member with respect to said rim member in one direction including a plurality of circumferentially spaced arcuate grooves provided in said hub member, a plurality of circumferentially spaced arcuate grooves formed in said rim member, each of said rim member grooves being adapted to be circumferentially spaced between a pair of said grooves of said hub member adjacent to each other when said rim member encircles said hub member and to be in circular alignment therewith, and a snap ring extending through said circularly aligned grooves.

9. A gear wheel construction as set forth in claim 8, in which, said circularly aligned rim and hub members are radially spaced outwardly of said engaging bearing surfaces and said snap ring is of the resiliently contractible type.

10. A gear wheel construction as set forth in claim 9, in which, said resilient means includes plugs of non-metallic elastically yieldable material.

11. A gear wheel construction comprising a hub member having a cylindrical bearing surface on its outer periphery; an externally toothed rim member encircling said hub member and having a cylindrical bearing surface on its inner periphery slidingly engaging said bearing surface of said hub member whereby said hub and rim members are circumferentially displaceable with respect to each other; means for positively limiting the extent of circumferential displacement between said hub and rim members including circumferentially spaced projections extending radially from the cylindrical bearing surface of one of said members into recesses formed in the other member, resilient means operatively interconnecting said members and extending radially on each side of said bearing surfaces for yieldable resisting circumferential displacement of said members, said hub member being provided with a plurality of circumferentially spaced arcuate grooves therein, said rim member having a plurality of circumferentially spaced arcuate grooves formed therein, each of said grooves of said rim member being adapted to be circumferentially spaced between a pair of said grooves of said hub member adjacent to each other when said rim member encircles said hub member to be in circular alignment therewith, and a snap ring extending through said circularly aligned grooves.

References Cited in the file of this patent

UNITED STATES PATENTS

| | | |
|---|---|---|
| 813,204 | Frayer et al. | Feb. 20, 1906 |
| 1,071,946 | Morse | Sept. 2, 1913 |
| 1,735,229 | Baker | Nov. 12, 1929 |
| 1,946,956 | Waseige | Feb. 13, 1934 |
| 2,505,120 | Jackson | Apr. 25, 1950 |